(No Model.)

A. W. PARMELEE.
WIRE COAT AND HAT HOOK.

No. 486,791. Patented Nov. 22, 1892.

Witnesses
Chas. F. Schmelz
R. M. Washburn

Inventor
Arthur W. Parmelee,
By his Attorney Charles G. Washburn

UNITED STATES PATENT OFFICE.

ARTHUR W. PARMELEE, OF WORCESTER, MASSACHUSETTS, ASSIGNOR TO THE WIRE GOODS COMPANY, OF SAME PLACE.

WIRE COAT AND HAT HOOK.

SPECIFICATION forming part of Letters Patent No. 486,791, dated November 22, 1892.

Application filed August 17, 1892. Serial No. 443,331. (No model.)

*To all whom it may concern:*

Be it known that I, ARTHUR W. PARMELEE, of the city and county of Worcester, and Commonwealth of Massachusetts, have invented certain new and useful Improvements in Wire Coat and Hat Hooks; and I do hereby declare that the following is a full, clear, and exact description thereof, reference being had to the accompanying drawings, forming a part of this specification, in which—

Figure 1:
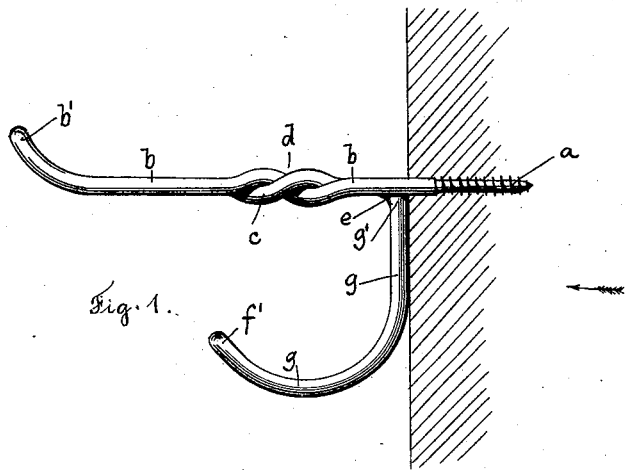
Figure 2:
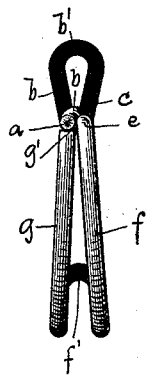
Figure 3:
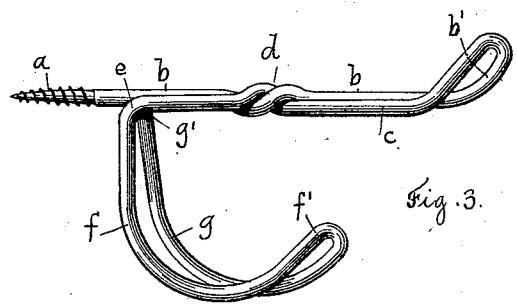

Figure 1 represents a side view of my improved hook, indicating the surface to which the hook is attached. Fig. 2 represents an end view, and Fig. 3 shows my improved hook in perspective.

My improved hook is made from a single piece of wire having a screw end $a$ for fastening the hook in position and bent as follows: The wire extends straight out from the screw end $a$ the desired length of the hook and is then bent to form the upper hook $b'$. It is then bent sidewise and back parallel to itself in the form of an elongated loop. It is then bent downward nearly at right angles to itself, forming the shoulder $e$ at a suitable distance from the screw end $a$, and is then bent back upon itself in the form of an elongated loop, so that the end of the wire shall form a rest or brace for the screw end $a$ at the point $g'$. The elongated loop last mentioned, standing substantially at right angles to the elongated loop first made, may now be bent so as to form a brace for the two parts $f$ and $g$ along the surface to which the hook is attached and the lower hook $f'$. The two parts $b$ and $c$ of the elongated loop as made are intertwisted at the point $d$, which adds greatly to the strength and stiffness of the hook. It is manifest that by this construction a wire coat and hat hook is produced of great strength and stiffness and standing straight out from the screw end $a$, firmly braced against the surface to which it is attached and affording a firm support for the screw end $a$ at the point $g'$, where a hook is always the weakest. Furthermore, intertwisting the two parts $b$ and $c$ of the hook at $d$ reinforces each at a point where strength is required and distributes the strain on either part over the other and upon all the supported parts of the hooks, as can readily be seen.

I do not confine myself to any particular form for the upper or lower hook, which may be made of any desired shape.

I am aware that hooks of wire have heretofore been made with screw ends for securing them in position, with certain parts intertwisted and the lower hook formed so as to afford a brace for the upper hook, one such form being shown in my patent, No. 433,182, dated July 29, 1890.

What I claim as new, and desire to secure by Letters Patent, is—

A coat and hat hook made from a single piece of wire threaded at one end and bent to form the upper hook $b'$, doubled in the form of an elongated loop, each part of which is in the same horizontal plane, and having the two parts of the loop $b$ and $c$ intertwisted at $d$, the part $c$ being continued parallel to and in the same horizontal plane with the part $b$ to a point near the base of the screw end $a$ and then bent downward substantially at right angles to itself and doubled in the form of an elongated loop, the free end of which terminates under the screw end $a$ at the point $g'$, the elongated loop being bent to form the lower hook $f'$, substantially as described.

ARTHUR W. PARMELEE.

Witnesses:
C. G. WASHBURN,
R. M. WASHBURN.